(12) United States Patent
Sun et al.

(10) Patent No.: US 8,697,208 B2
(45) Date of Patent: Apr. 15, 2014

(54) POLYSTYRENE NANOCOMPOSITES FOR BLOW MOLDING APPLICATIONS (75) Inventors: Luyi Sun, Pearland, TX (US); Jose Sosa, Deer Park, TX (US); Juan Aguirre, League City, TX (US); Mark Leland, Houston, TX (US); Theodore Harris, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 616 days.

(21) Appl. No.: 12/508,598

(22) Filed: Jul. 24, 2009

(65) Prior Publication Data

US 2011/0020571 A1 Jan. 27, 2011

(51) Int. Cl.
*B32B 1/02* (2006.01)
*C08K 3/34* (2006.01)

(52) U.S. Cl.
USPC .......................................... 428/35.7; 524/445

(58) Field of Classification Search
USPC .................. 428/35.7, 35.8; 264/531; 524/445
See application file for complete search history.

(56) References Cited

U.S. PATENT DOCUMENTS

| | | | |
|---|---|---|---|
| 4,777,210 A | 10/1988 | Sosa et al. | |
| 5,081,323 A | 1/1992 | Innes et al. | |
| 5,972,446 A | 10/1999 | Kaya et al. | |
| 6,486,253 B1 * | 11/2002 | Gilmer et al. | 524/445 |
| 6,617,020 B2 * | 9/2003 | Zhou et al. | 428/355 R |
| 6,841,211 B1 | 1/2005 | Knoll et al. | |
| 7,179,873 B2 | 2/2007 | Reimers et al. | |
| 2002/0022099 A1 | 2/2002 | Schmidt et al. | |
| 2004/0022977 A1 * | 2/2004 | Sandstrom et al. | 428/35.7 |
| 2004/0254284 A1 * | 12/2004 | Doh | 524/445 |
| 2004/0260000 A1 * | 12/2004 | Chaiko | 524/445 |
| 2005/0075237 A1 | 4/2005 | Kelly et al. | |
| 2006/0111597 A1 | 5/2006 | Kelly et al. | |
| 2006/0255049 A1 | 11/2006 | McCarthy et al. | |
| 2007/0154709 A1 * | 7/2007 | Koch et al. | 428/379 |
| 2007/0161835 A1 | 7/2007 | Butler et al. | |
| 2007/0161836 A1 | 7/2007 | Butler et al. | |
| 2007/0161838 A1 | 7/2007 | Butler et al. | |
| 2008/0058566 A1 | 3/2008 | Butler et al. | |

OTHER PUBLICATIONS

Kamal M, Calderon J, Lennox B. Surface Energy of Modified Nanoclays and Its Effect on Polymer/Clay Nanocomposites. Journal of Adhesion Science & Technology [serial online]. Apr. 2009;23(5):663-688. Available from: Academic Search Premier, Ipswich, MA.*
U.S. Appl. No. 12/365,113, filed Feb. 3, 2009, Sosa et al.
Polymer Handbook, 4th edition by J. Brandrup, E. H. Immergut, and E.A. Grulke, p. 688-694 John Wiley & Sons, Inc. (1999).
J. Applied Chemistry, vol. 3, P.A. Small, p. 71-80 (1953).

* cited by examiner

Primary Examiner — Erik Kashnikow (57) ABSTRACT

Disclosed is a polystyrene based polymer/layered compound nanocomposite for injection blow molding or injection stretch blow molding of articles. The nanocomposite can reduce shrinkage and warpage to the preform during the reheating process compared to neat polystyrene. The incorporation of layered compounds can increase the processability of PS preforms, help improve heating efficiency, and improve bottle mechanical properties. The layered compound can be treated with chemicals or compounds having an affinity with the styrene monomer or polystyrene, thus producing a treated layered compound having an affinity with the styrene monomer or polystyrene. The monomer and the layered compound can be combined prior to polymerization. The polymer and layered compound can be combined by solution mixing in a solvent. The layered compound can also be incorporated into the mixture by compounding a polymer product with the layered compound, or the combination of any of the above three approaches.

19 Claims, 4 Drawing Sheets

Before Heating

Fig. 3B

After Heating

POLYSTYRENE NANOCOMPOSITES FOR BLOW MOLDING APPLICATIONS

FIELD

Embodiments of the present invention generally relate to blow molding of polystyrene. In particular, embodiments of the invention relate to incorporating a layered compound such as clay nanoplatelets into the polystyrene for injection stretch blow molding and injection blow molding of styrene based polymers.

BACKGROUND

In general, a high quality packaging material is one that creates a good oxygen and moisture barrier. Packaged goods are intended to last longer typically by reducing their interaction with oxygen and water, which usually can deteriorate the product causing waste and other problems. Polymeric materials are often used as packaging materials because they create a good oxygen/moisture barrier and their appearance and shape can be easily controlled. Plastic materials are also used in place of glass for bottling because they are lighter, are more resistant to breakage when dropped, and can be less expensive. Several common polymeric materials used for packaging are polyethylene (PE), polyethylene terephthalate (PET), polypropylene (PP), polycarbonate (PC), and polystyrene (PS).

Polystyrene is one of the largest volume thermoplastic resins in commercial production today. It is a hydrocarbon chain containing a phenyl group on every other carbon atom. Polystyrene is a durable polymer that is frequently encountered in daily life. A few common examples of polystyrene are plastic toys, computer housings, foam packaging, foam cups, etc.

Injection blow molding (IBM) and injection stretch blow molding (ISBM) are well-developed techniques to produce plastic containers that include the formation of a preform that is subsequently heated and blow molded to produce a hollow container. Preforms are generally condensed shapes, which may include relatively thick-walled tube shaped articles having a threaded neck to facilitate appropriate closure. The preforms can be blown into a desired article shape by heating, stretching, and blowing the preform with a compressed gas. The compressed gas expands the preform into the shape of the mold.

Polymer nanocomposites comprise polymeric materials and inorganic layered compounds, such as clay. When these inorganic layered components are properly incorporated into a polymer matrix, significant improvements in physical and mechanical properties can be displayed. The extent of uniformity of the layered compound incorporated into the polymer matrix influences the characteristics of the nanocomposite.

A high degree of intercalation (the inserting of a molecule, or group of molecules, between a layer of clays) and exfoliation (the delamination of layered materials into disordered layers or sheets) are desired in order to achieve proper incorporation of the inorganic layered compounds into a polymer matrix. In order to achieve a high degree of intercalation and exfoliation, the clays can be treated by some organic chemicals to increase their surface hydrophobicity and interlayer distances. These clays can be referred to as organoclays.

An initial evaluation of polystyrene for blow molding applications led to shrinkage and warpage issues. It is desirable to have polystyrene compositions that can minimize shrinkage and warpage during blow molding.

SUMMARY

Embodiments of the present invention include a preform for use in blow molding processes of polystyrene based polymer. The preform includes a neck having an internal neck diameter and an external neck diameter, a body comprising an internal body diameter and an external body diameter which together form a sidewall, and is made of a nanocomposite including a polystyrene based polymer and a layered compound.

The layered compound can be selected from the group consisting of natural clay, synthetic clay, sols, colloids, gels, and fumes. The layered compound can be a treated layered compound formed by treating a layered compound with an organic compound to produce a treated layered compound having an affinity with styrene. The layered compound can be treated by a chemical that has an organic group having a solubility parameter, wherein the difference between the organic group solubility parameter and the solubility parameter of styrene is no more than 3.0 $(MPa^{1/2})$.

The layered compound can be treated by a chemical that comprises at least one hydrocarbon ring group, or by a chemical that comprises at least one methacrylate group. The layered compound can be treated by a chemical that is represented by the formula:

where HT is Hydrogenated Tallow (~65% $C_{18}$; ~30% $C_{16}$; ~5% $C_{14}$).

The invention can include an article formed by the blow molding of the preform described herein. The preform can have a shrinkage of less than 38% when reheated during a blow molding process. The preform can have a warpage of less than 8.5% when reheated during a blow molding process.

The layered compound incorporated within the preforms can help absorb energy, thus improving reheating efficiency. As a result, embodiments of the invention can include preforms made of nanocomposites that can reach a temperature of at least 5° F. higher than an identical preform without the layered compound when reheated during a blow molding process under the same conditions.

Embodiments of the present invention include a method of forming a blow molded article by providing a nanocomposite comprising a polystyrene based polymer and a layered compound, forming a preform from the nanocomposite, heating the preform, and injection blow molding the preform into an article. The preform has at least one layer of the nanocomposite and can include one or more layers of a polystyrene based polymer that is not a nanocomposite. The injection blow molding can include injection stretch blow molding the preform into an article. The layered compound can be selected from the group consisting of natural clay, synthetic clay, sols, colloids, gels, and fumes. The method can include the layered compound being a treated layered compound formed by treating a layered compound with an organic compound to produce a treated layered compound having an affinity with styrene.

The layered compound can be treated by a chemical that has an organic group having a solubility parameter, wherein the difference between the organic group solubility parameter and the solubility parameter of styrene is no more than 3.0 (MPa$^{1/2}$). The layered compound can be treated by a chemical that has at least one hydrocarbon ring group. The layered compound can be treated by a chemical that has at least one methacrylate group.

The layered compound can be treated by a chemical that is represented by the formula:

where HT is Hydrogenated Tallow (~65% $C_{18}$; ~30% $C_{16}$; ~5% $C_{14}$).

The method can include heating of the preform resulting in shrinkage of less than 38% and warpage of less than 8.5%.

The layered compound incorporated within the preforms can help absorb energy, thus improving reheating efficiency. As a result, embodiments of the invention can include preforms made of nanocomposites that can reach a temperature at least 5° F. higher than an identical preform without the layered compound when heated under the same conditions. The invention can include an article formed by the method described.

An embodiment of the present invention is a method for production of a blow-molded article having improved morphology, processability and heating efficiency. The method includes mixing polystyrene based polymer with a treated layered compound to form a polymeric nanocomposite and forming a preform from the polymeric nanocomposite. The preform has at least one layer of the nanocomposite and can include one or more layers of a polystyrene based polymer that is not a nanocomposite. The preform is heated to a first temperature sufficient for blow molding the preform and injection stretch blow molding the preform into an article. The treated layered compound can be formed by treating a layered compound with an organic compound to produce a treated layered compound having an affinity with the polystyrene based polymer prior to mixing. The layered compound improves the preform heating efficiency and therefore the first temperature is at least 5° F. higher than the temperature of an identical preform without the layered compound when heated under the same conditions. The heating of the preform results in a shrinkage of less than 38% and a warpage of less than 8.5%.

The mixing of the polymer and the treated layered compound can include at least one of the processes of: compounding the polymer and the treated layered compound; solution mixing the polymer and the treated layered compound in a solvent; or mixing the treated layered compound with a styrene based monomer prior to polymerization.

DETAILED DESCRIPTION

Injection blow molding (IBM) and injection stretch blow molding (ISBM) are well-developed techniques to produce plastic containers that include the formation of a preform that is subsequently heated and blow molded to produce a hollow container. Preforms are generally condensed shapes, which may include relatively thick-walled tube shaped articles having a threaded neck to facilitate appropriate closure. The preforms can be blown into a desired article shape by heating, stretching, and blowing the preform with a compressed gas. The compressed gas expands the preform into the shape of the mold.

The injection stretch blow molding process can be either a single or double stage process. The single stage process injects the molten polymer into the preform mold creating the preform, stretches the preform, and finally blows the preform into the finished shape all in the same process. In a double stage process, performs are injection molded at the first stage. After the preforms are cooled down, they are reheated and subsequently stretched/blow molded into bottles at the second stage.

Figure 1:
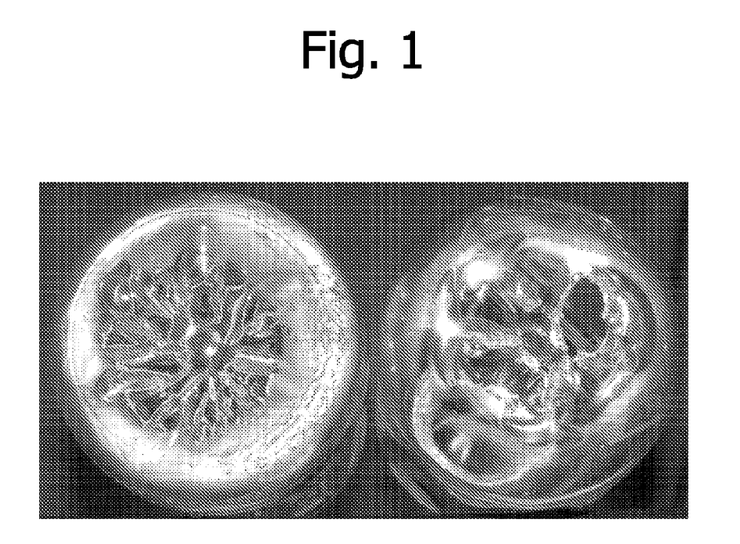
FIG. 1 shows the bottom of two articles showing non-uniform thickness and whitening (left) or blow-out (right).

Polystyrene is a material under development for blow molding applications. An initial evaluation of polystyrene for ISBM applications resulted in a high rejection rate and the molded bottles exhibited inconsistent properties. Both crystal and high impact polystyrene (HIPS) grades exhibited shrinkage and uneven shrinkage. Moreover, the uneven shrinkage during reheating resulted in warpage along the preform axial (off-center). Such off-centered preforms can give rise to a non-uniform bottle bottom and poor mechanical properties. In addition, the bottle bottom can show signs of whitening, an undesirable characteristic for the finished part as shown in FIG. 1. Thus, it is important to address the shrinkage and warpage issues associated with PS ISBM process.

The incorporation of inorganic fillers, such as layered fillers, may reduce PS chain relaxation upon reheating by constraining the flexible chains within the stiff inorganic layers. This effect may be enhanced if the filler is incorporated into the matrix on a nanometer scale. Thus, clay based nanocomposites appear to be potential candidates for improving the processing of PS in IBM and ISBM processes.

As used herein "nanocomposites" refer to materials that are created by introducing nanoparticles with at least one dimension less than 100 nanometers (nm), also called filler materials (e.g., a layered compound) into a macroscopic material (e.g., polymeric material), which is commonly referred to as the matrix. According to embodiments of the invention the preform and resulting article from blow molding the preform comprise a nanocomposite having a layered filler material (also referred to as a nanofiller) and a polystyrene matrix.

The layered compounds can include natural and synthetic clay, sols, colloids, gels, fumes, and the like. In an embodiment, the nanocomposite comprises clay. In accordance with this disclosure, clays refer to aggregates of hydrous silicate particles either naturally occurring or synthetically produced, and may consist of a variety of minerals rich in silicon and aluminum oxides and hydroxides which include variable amounts of other components such as alkali earth metals and water. Naturally occurring clays are usually formed by chemical weathering of silicate-bearing rocks, although some are formed by hydrothermal activity. These types of clays can be replicated in industrial chemical processes. Many types of clay have sheet-like (layered) structures and these layers are typically referred to as platelets. These platelets have a degree of flexibility with a thickness on the order of 1 nm and aspect ratios of 50 to 1500.

The clays used in an embodiment of the present invention can be organophilic and such clays are typically referred to as organoclay. Organoclay is an organically modified silicate compound that is derived from natural or synthetic clay. Organoclay can be produced from clays that are typically hydrophilic by ion exchange with an organic cation. Some examples of layered materials suitable as components in organoclays include without limitation natural or synthetic bentonite, montmorillonite, hectorite, fluorohectorite, saponite, stevensite, nontronite, sauconite, glauconite, vermiculite, chlorite, mica, hydromica, muscovite, biotite, phlogopite, illite, talc, pyrophillite, sepiolite, attapulgite, palygorskite, berthierine, serpentine, kaolinite, dickite, nacrite, halloysite, allophane, imogolite, hydrotalcite, pyroaurite, calcite, wollastonite, or combinations thereof.

Examples of an organoclay suitable for use in this disclosure include without limitation CLOISITE 10A, CLOISITE 15A, and CLOISITE 20A, which are commercially available from Southern Clay Products, Inc.

CLOISITE 10A has the composition that is represented by the formula:

where HT is Hydrogenated Tallow (~65% $C_{18}$; ~30% $C_{16}$; ~5% $C_{14}$); Anion: Chloride; Cation exchange capacity (CEC): 125 meq/100 g clay.

CLOISITE 15A has the composition that is represented by the formula:

where HT is Hydrogenated Tallow (~65% $C_{18}$; ~30% $C_{16}$; ~5% $C_{14}$); Anion: Chloride; Cation exchange capacity (CEC): 125 meq/100 g clay.

CLOISITE 20A has the composition that is represented by the formula:

where HT is Hydrogenated Tallow (~65% $C_{18}$; ~30% $C_{16}$; ~5% $C_{14}$); Anion: Chloride; Cation exchange capacity (CEC): 95 meq/100 g clay.

In embodiments of the invention, the organoclay may be present in an amount of from 0.1 weight percent (wt. %) to 50 wt. %, alternatively from 0.5 wt. % to 25 wt. %, or from 1 wt. % to 10 wt. %.

In accordance with the invention, the nanocomposite comprises a polystyrene based polymer. The polymer may be present in the nanocomposite in an amount of from 50 wt. % to 99.9 wt. %, or from 90 wt. % to 99.5 wt. %, or from 95 wt. % to 99 wt. % based on the total weight of the nanocomposite.

In an embodiment, the polystyrene based polymer can be formed from monomers having a phenyl group. More specifically, the polymer can be formed from monomers having an aromatic moiety and an unsaturated alkyl moiety. Such monomers may include monovinylaromatic compounds such as styrene as well as alkylated styrenes wherein the alkylated styrenes are alkylated in the nucleus or side-chain. Alphamethyl styrene, t-butylstyrene, p-methylstyrene, acrylic and methacrylic acids or substituted esters of acrylic or methacrylic acid, and vinyl toluene are suitable monomers that may be useful in forming a polystyrene based polymer of the invention. These monomers are disclosed in U.S. Pat. No. 7,179,873 to Reimers et al., which is incorporated by reference in its entirety.

The polystyrene based polymer component in the nanocomposite can be a styrenic polymer (e.g., polystyrene), wherein the styrenic polymer may be a homopolymer or may optionally comprise one or more comonomers. Styrene, also known as vinyl benzene, ethenylbenzene, phenethylene and phenylethene is an aromatic organic compound represented by the chemical formula $C_8H_8$. Styrene is widely commercially available and as used herein the term styrene includes a variety of substituted styrenes (e.g. alpha-methyl styrene), ring substituted styrenes such as p-methylstyrene, distributed styrenes such as p-t-butyl styrene as well as unsubstituted styrenes.

In an embodiment, the styrenic polymer has a melt flow as determined in accordance with ASTM D1238 of from 1.0 g/10 min to 30.0 g/10 min, alternatively from 1.5 g/10 min to 20.0 g/10 min, alternatively from 2.0g/10 min to 15.0 g/10 min; a density as determined in accordance with ASTM D1505 of from 1.04 g/cc to 1.15 g/cm$^{33}$, alternatively from 1.05 g/cm$^3$ to 1.10 g/cc, alternatively from 1.05 g/cm$^3$ to 1.07 g/cm$^3$, a Vicat softening point as determined in accordance with ASTM D1525 of from 227° F. to 180° F., alternatively from 224° F. to 200° F., alternatively from 220° F. to 200° F.; and a tensile strength as determined in accordance with ASTM D638 of from 5800 psi to 7800 psi. Examples of styrenic polymers suitable for use in this disclosure include without limitation CX5229 and PS535, which are polystyrenes available from Total Petrochemicals USA, Inc. In an embodiment the styrenic polymer (e.g., CX5229) has generally the properties set forth in Table 1.

TABLE 1

| | Typical Value | Test Method |
|---|---|---|
| Physical Properties | | |
| Melt Flow, 200/5.0 g/10 m | 3.0 | D1238 |
| Tensile Properties | | |
| Strength, psi | 7,300 | D638 |
| Modulus, psi (10$^5$) | 4.3 | D638 |
| Flexular Properties | | |
| Strength, psi | 14,000 | D790 |
| Modulus, psi (10$^5$) | 4.7 | D790 |
| Thermal Properties | | |
| Vicat Softening, deg. F. | 223 | D1525 |

In some embodiments, the styrenic polymer or polystyrene based polymer further comprises a comonomer which when polymerized with styrene forms a styrenic copolymer. Examples of such copolymers may include for example and without limitation α-methylstyrene; halogenated styrenes; alkylated styrenes; acrylonitrile; esters of methacrylic acid with alcohols having 1 to 8 carbons; N-vinyl compounds such as vinylcarbazole and maleic anhydride; compounds which contain two polymerizable double bonds such as for example and without limitation divinylbenzene or butanediol diacrylate; or combinations thereof. The comonomer may be present in an amount effective to impart one or more user-desired properties to the composition. Such effective amounts may be determined by one of ordinary skill in the art with the aid of this disclosure. For example, the comonomer may be present in the styrenic polymer in an amount ranging from 0.1 wt. % to 99.9 wt. % by total weight of the nanocomposite, alternatively from 1 wt. % to 90 wt. %, and further alternatively from 1 wt. % to 50 wt. %.

In an embodiment, the polymer or polystyrene based polymer also comprises a thermoplastic material. Herein a thermoplastic material refers to a plastic that melts to a liquid when heated and freezes to form a brittle and glassy state when cooled sufficiently. Examples of thermoplastic materials include without limitation acrylonitrile butadiene styrene, celluloid, cellulose acetate, ethylene vinyl acetate, ethylene vinyl alcohol, fluoroplastics, ionomers, polyacetal, polyacrylates, polyacrylonitrile, polyamide, polyamide-imide, polyaryletherketone, polybutadiene, polybutylene, polybutylene terephthalate, polychlorotrifluoroethylene, polyethylene terephthalate, polycyclohexylene dimethylene terephthalate, polycarbonate, polyetherimide, polyethersulfone, polyethylenechlorinate, polyimide, polylactic acid, polymethylpentene, polyphenylene oxide, polyphenylene sulfide, polyphthalamide, polypropylene, polysulfone, polyvinyl chloride, polyvinylidene chloride, and combinations thereof. For example, the thermoplastic material may be present in the styrenic polymer in an amount ranging from 0.1 wt. % to 50 wt. % by total weight of the nanocomposite.

In an embodiment, the polymer or polystyrene based polymer comprises an elastomeric phase that is embedded in a polymer matrix. For instance, the polymer may comprise a styrenic polymer having a conjugated diene monomer as the elastomer. Examples of suitable conjugated diene monomers include without limitation 1,3-butadiene, 2-methyl-1,3-butadiene, and 2-chloro-1,3-butadiene. Alternatively, the thermoplastic may comprise a styrenic polymer having an aliphatic conjugated diene monomer as the elastomer. Without limitation, examples of suitable aliphatic conjugated diene monomers include $C_4$ to $C_9$ dienes such as butadiene monomers. Blends or copolymers of the diene monomers may also be used. Examples of thermoplastic polymers include without limitation acrylonitrile butadiene styrene (ABS), high impact polystyrene (HIPS), methyl methacrylate butadiene (MBS), and the like. The elastomer may be present in an amount effective to impart one or more user-desired properties to the composition. Such effective amounts may be determined by one of ordinary skill in the art with the aid of this disclosure. For example, the elastomer may be present in the styrenic polymer in an amount ranging from 0.1 wt. % to 50 wt. % by total weight of the nanocomposite, or from 1 wt. % to 25 wt. %, or from 1 wt. % to 10 wt. %.

In accordance with the invention, the nanocomposite also optionally comprises additives, as deemed necessary to impart desired physical properties. The additives used in the invention may be additives having different polarities. Additives suitable for use in the invention include without limitation zinc dimethacrylate, hereinafter referred to as "ZnDMA", stearyl methacrylate, hereinafter referred to as "StMMA", and hydroxyethylmethacrylate, hereinafter referred to as "HEMA".

These additives may be included in amounts effective to impart desired physical properties. In an embodiment, the additive(s) are included in amounts of from 0.01 wt. % to 10 wt. %. In another embodiment, when ZnDMA is the additive, it is present in amounts of from 0.01 wt. % to 5 wt. %. In another embodiment, when the additive is StMMA or HEMA, the additive is present in amounts of from 1 wt. % to 10 wt. %.

The chemically treated clay, CLOISITE 10A, has an affinity with styrene monomers and can exhibit a high degree of exfoliation when added to styrene, as disclosed in U.S. patent application Ser. No. 12/365,113,incorporated herein in its entirety. CLOISITE 10A, having a benzyl group attached to it, exhibits high affinity with the benzyl structure of styrene. CLOISITE 10A was found to have more structures having a higher degree of exfoliation within a sample of nanocomposite comprising styrene polymer than organoclays not having a benzyl group. Other organoclays having hydrocarbon ring structures can have an affinity to a styrenic based monomer and can be desirable for use in the present invention. Organoclays having methacrylate groups attached can also provide an affinity to styrenic based monomers.

As used herein two materials have an affinity for each other if there is no more than 3.0 $(MPa^{1/2})$ difference between their solubility parameters. CLOISITE 10A contains a benzyl group, benzene having a solubility parameter of 18.8 $(MPa^{1/2})$ while styrene has a solubility parameter of 19.0 $(MPa^{1/2})$. The addition of the organic compound to the clay, in this instance the benzyl group, provides an affinity between the clay and the polymer, as the solubility parameter of the benzyl group is close to that of the styrene. Other hydrocarbon ring structures have solubility parameters that would impart an affinity for styrene, such as cyclohexane with a solubility parameter of 16.8 $(MPa^{1/2})$, cyclopentane with a solubility parameter of 17.8 $(MPa^{1/2})$, and cyclopentanone with a solubility parameter of 21.3 $(MPa^{1/2})$.

As non-limiting examples, Table 2 provides a list of various ring structured groups and methacrylate groups that may be used to modify a layered compound to provide an affinity between the layered compound and the monomer or polymer that the layered compound is being dispersed into. Data in Table 2 is taken from the Polymer Handbook, 4th edition by J. Brandrup, E. H. Immergut, and E. A Grulke, John Wiley & Sons, Inc., 1999. The solubility parameter can be changed via copolymerization and solubility parameters for different structures can be calculated via the techniques given in the Polymer Handbook and published by P. A. Small [J. Applied Chemistry, Vol. 3, p. 71 (1953)] by using molar-attraction constants.

TABLE 2

| Solvent | Solubility Parameter $(MPa^{1/2})$ |
|---|---|
| Butyl methacrylate | 16.8 |
| Cyclohexane | 16.8 |
| Ethyl methacrylate | 17.0 |
| Methyl styrene | 17.4 |
| Cyclopentane | 17.8 |
| Chlorotoluene | 18.0 |
| Ethylbenzene | 18.0 |
| Methyl methacrylate | 18.0 |
| Xylene (p-xylene) | 18.0 |
| Toluene | 18.2 |

TABLE 2-continued

| Solvent | Solubility Parameter (MPa$^{1/2}$) |
|---|---|
| Vinyl toluene | 18.6 |
| Benzene | 18.8 |
| Methylcyclohexanone | 19.0 |
| Styrene | 19.0 |
| Furan | 19.2 |
| Chlorobenzene | 19.4 |
| Cyclohexanone | 20.3 |
| Dichlorobenzene | 20.5 |
| Nitrobenzene | 20.5 |
| Iodobenzene | 20.7 |
| Cyclopentanone | 21.2 |
| Cyclobutanedione | 22.5 |

In an embodiment, a method for production of the styrenic polymer comprises contacting styrene monomer and other components under proper polymerization reaction conditions. The polymerization process may be operated under batch or continuous process conditions. In an embodiment, the polymerization reaction may be carried out using a continuous production process in a polymerization apparatus comprising a single reactor or a plurality of reactors. In an embodiment of the invention, the polymeric composition can be prepared for an upflow reactor. Reactors and conditions for the production of a polymeric composition are disclosed in U.S. Pat. No. 4,777,210, to Sosa et al., which is incorporated by reference in its entirety.

The operating conditions, including temperature ranges, can be selected in order to be consistent with the operational characteristics of the equipment used in the polymerization process. In an embodiment, polymerization temperatures range from 190° F. to 460° F. In another embodiment, polymerization temperatures range from 200° F. to 360° F. In yet another embodiment, the polymerization reaction may be carried out in a plurality of reactors, wherein each reactor is operated under an optimum temperature range. For example, the polymerization reaction may be carried out in a reactor system employing first and second polymerization reactors that are either both continuously stirred tank reactors (CSTR) or both plug-flow reactors or one reactor a CSTR and the other a plug-flow reactor. In an embodiment, a polymerization reactor for the production of a styrenic copolymer of the type disclosed herein may comprise a plurality of reactors wherein the first reactor (e.g., a CSTR), also known as the prepolymerization reactor, is operated in the temperature range of from 190° F. to 275° F. while the second reactor (e.g., CSTR or plug flow) may be operated in the range of 200° F. to 330° F.

The polymerized product effluent may be referred to herein as the prepolymer. When the prepolymer reaches a desired conversion, it may be passed through a heating device into a second reactor to achieve further polymerization. The polymerized product effluent from the second reactor may be further processed as desired or needed. Upon completion of the polymerization reaction, a styrenic polymer is recovered and subsequently processed, for example devolatized, pelletized, etc.

In accordance with the invention, the layered compound may be incorporated into the polymer/monomer at any stage of the polymerization process, for example, including without limitation before, during, or after the polymerization process. In an embodiment, the layered compound is incorporated by mixing of a monomer with the layered compound. For example, by the mixing of styrene monomer with organoclay prior to in situ polymerization. In another embodiment, the layered compound is incorporated by compounding the polymerized product with a layered compound. For example, compounding polystyrene with an organoclay. In yet another embodiment, the layered compound is incorporated by solution mixing with a polymer, such as polystyrene, in a proper solvent, such as toluene or tetrahydrofuran. For example, solution mixing polystyrene with an organoclay in toluene.

In an embodiment the layered compound is compounded with a polymer. In such an embodiment, in reference to FIG. 5, the method 100 may initiate by contacting the polymer 110 and a layered compound 120 to form a mixture via extrusion compounding 130. Extrusion compounding 130 refers to the process of mixing a polymer with one or more additional components wherein the mixing may be carried out using a continuous mixer such as for example a mixer consisting of a short non-intermeshing counter rotating twin screw extruder or a gear pump for pumping.

In another embodiment, the polymerized product resulting from in situ polymerization of a monomer with a layered compound is subjected to extrusion compounding 130 to achieve further exfoliation and dispersion of the layered compound. In yet another embodiment, the nanocomposite product resulting from a mixed solution comprising polystyrene and a layered compound, which is dried after solution mixing, can be subjected to extrusion compounding 130 to achieve further exfoliation and dispersion of the layered compound.

Extrusion compounding 130 may produce a composition in which some of the polymer has been intercalated into the layered compound as depicted in structure 140a. In structure 140a, the polymer 110 is inserted between platelets of the layered compound 120 such that the interlayer spacing of the layered compound 120 is expanded but still possess a well-defined spatial relationship with respect to each other. Extrusion compounding 130 may also result in some degree of exfoliation as shown in 140b in which the platelets of the layered compound 120 have been separated and the individual layers are distributed throughout the polymer 110. The mixture of layered compound and polymer after having been extrusion compounded is hereinafter referred to as the extruded mixture 140a,b.

The method 100 can also include further processing 150 of the extruded mixture 140a,b, such as by imparting shear stresses or orientation forces. The further processing 150 can result in increased exfoliation of the resulting product 160a,b, where the platelets of the layered compound 120 have been further separated and the individual layers are distributed throughout the polymer 110 providing an intercalated/exfoliated morphology. Although 140b may have a higher degree of exfoliation than 140a, depending on the extent and effectiveness of the further processing 150, 160b may or may not have a higher degree of exfoliation than 160a.

As disclosed in U.S. patent application Ser. No. 12/365,113, an article constructed from a nanocomposite containing a layered compound with the polymer/monomer showed an improvement in both flexural modulus and Young's modulus, compared to the polymer lacking the layered compound. Young's modulus is a measure of the stiffness of a material and is defined as the ratio of the rate of change of stress with strain. Young's modulus can be determined experimentally from the slope of a stress-strain curve created during tensile tests conducted on a sample of a material, as determined in accordance with ASTM D882. In an embodiment, the article made from the nanocomposite may exhibit an increase in Young's modulus at yield when compared to a similar article constructed from a polymer lacking the layered compounds of from 5% to 300%, alternatively from 10% to 100%, alternatively from 20% to 50%. The flexural modulus is another measure of the stiffness of a material and is defined as the amount of applied force over the amount of deflected distance. The flexural modulus is measured in accordance with ASTM D790. In an embodiment, the article made from the nanocomposite may exhibit an increase in flexural modulus when compared to a similar article constructed from a polymer lacking the layered compounds of from 5% to 300%, alternatively from 10% to 100%, alternatively from 20% to 50%. In another embodiment, the article made from nanocomposite may exhibit an increase in tensile strength at yield, as determined in accordance with ASTM D882, when compared to a similar article constructed from a polymer that does not contain the layered compounds of from 5% to 300%, alternatively from 10% to 100%, alternatively from 20% to 50%.

The optical properties of the nanocomposite containing a layered compound are dependent upon the degree of dispersion of the layered compound. When the layered compound is well exfoliated and uniformly dispersed, the negative optical effect of the layered compound is minimal. Conversely, poor dispersion of the layered compound in the nanocomposite leads to a significant drop in the clarity of the nanocomposite and the articles made from the nanocomposite. Nanocomposites containing organoclays having an increased affinity with the styrenic polymer lead to greater exfoliation and are more uniformly dispersed, thereby providing better optical properties.

EXAMPLE

In order to evaluate the effects of the clay based nanocomposites, a PS nanocomposite made from commercially available polystyrene PS535 from Total Petrochemicals, Inc. was mixed with 5 wt % of CLOISITE 10A, an organoclay commercially available from Southern Clay Products, Inc., herein referred to as 535/10A. The 535/10A mixture was compounded using a twin-screw extruder and was molded into preforms on a Netstal injection molder. The preforms were conditioned at room temperature for at least 24 hours before they were stretch-blow-molded into bottles on an ADS G62 linear injection stretch blow molder.

In the ISBM process, the 535/10A preforms exhibited lower shrinkage, and limited warpage, as compared to preforms of neat PS535. Thus, the preforms were successfully blow molded into bottles at the four conditions shown below in Table 3.

TABLE 3

Summary of processing conditions of PS535 and 535/10A preforms.

| Preform | Oven 10 and 20, 2000 b/h | Oven 10 and 20, 3000 b/h | Oven 20 only, 2000 b/h | Oven 20 only, 3000 b/h | Temperature before blow molding (Oven 10 and 20, 2000 b/h) |
|---|---|---|---|---|---|
| PS535 | ~50% rejection rate, significant whitening on the bottom | | Not enough heat | | 260° F. |
| 535/10A (5 wt %) | <2% rejection rate, with few whitening signs on the bottom | | | | 246° F. |

Figure 3A:
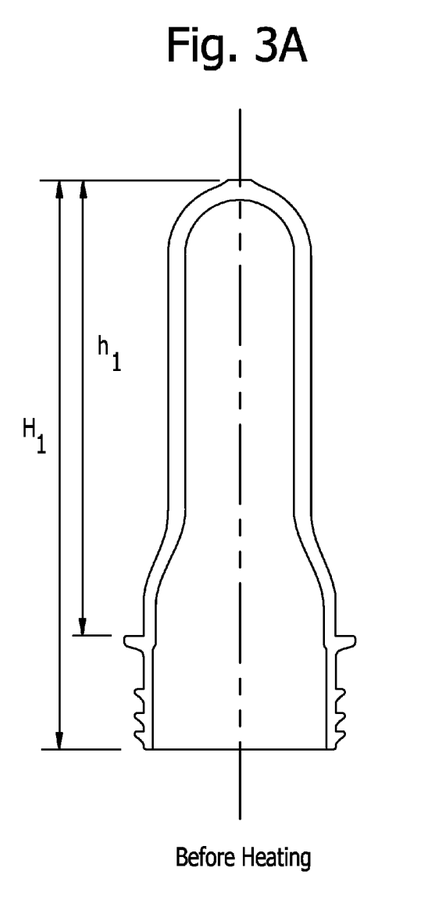
FIG. 3A and FIG. 3B show cross sections of a preform illustrating shrinkage and warpage before and after heating.
Figure 3B:
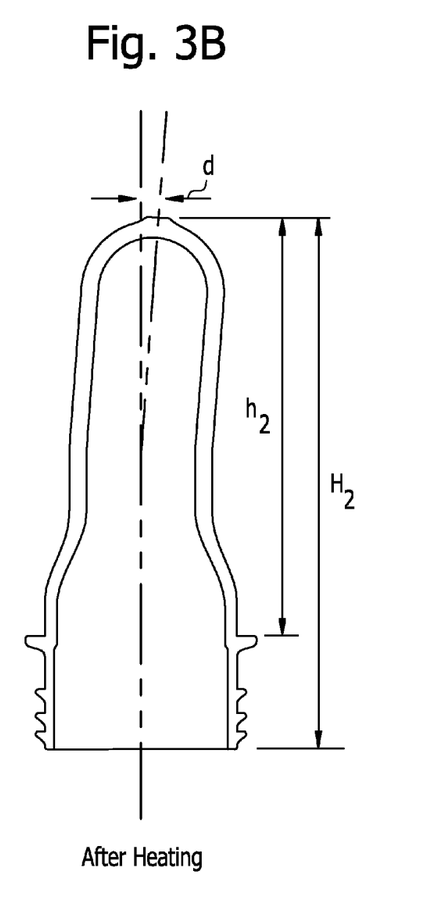
Figure 4:
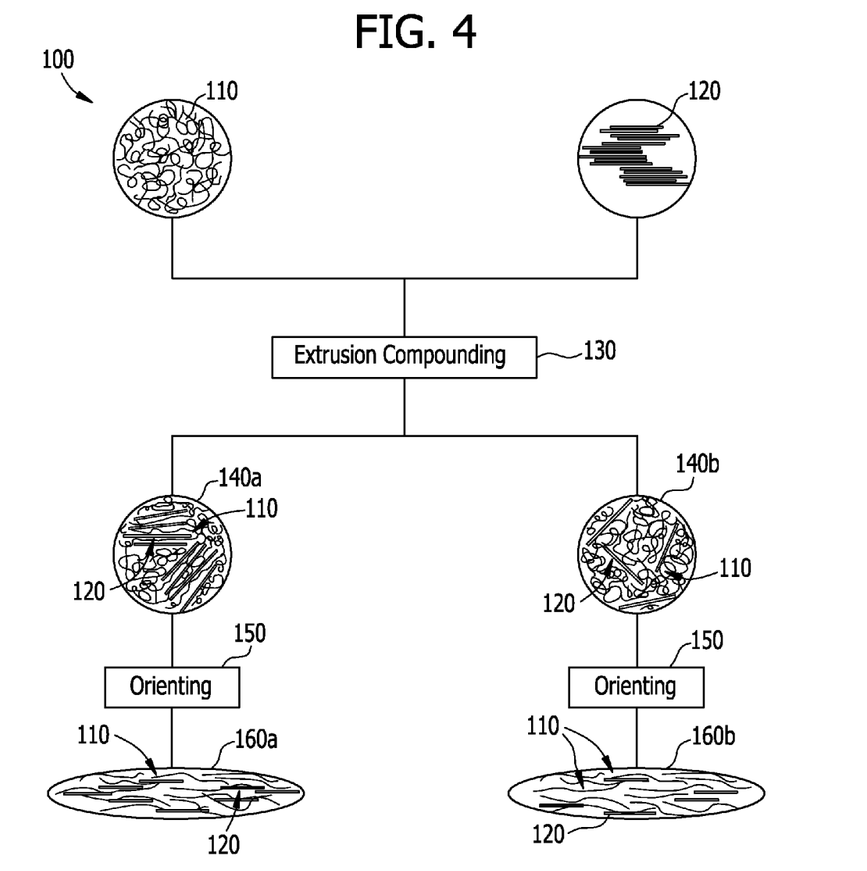
FIG. 4 represents a method of preparing a layered compound/polymer composite involving extrusion compounding.

FIG. 3A shows a cross section view of a preform before heating and FIG. 3B shows a cross section view of the preform after heating. The first preform length ($H_1$) and the first body length ($h_1$) are shown in FIG. 3A. The preform length after heating ($H_2$), body length after heating ($h_2$) and amount of deviation (d) are shown in FIG. 3B. Shrinkage is defined as $(h_1-h_2)/h_1$ and warpage is defined as $d/h_2$.

Figure 2:
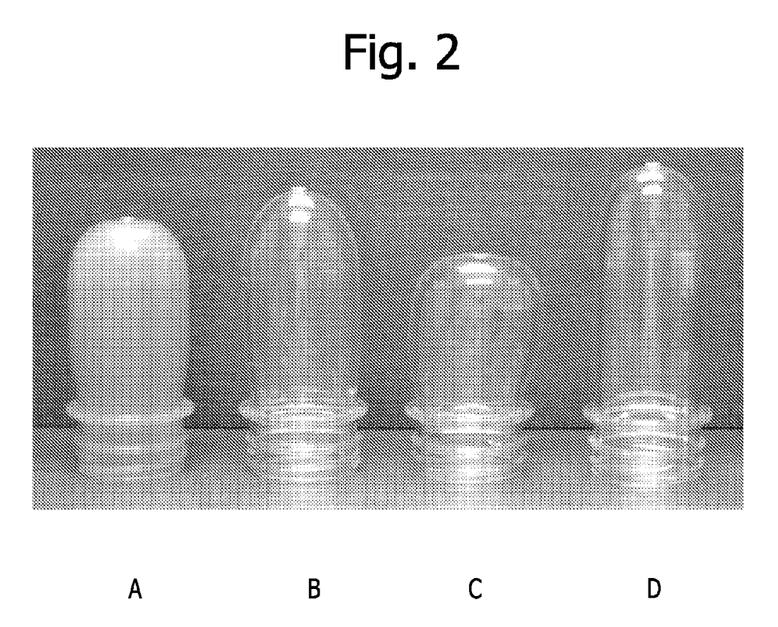
FIG. 2 shows (A) a PS535/10A preform after heating to optimum conditions for blow molding; (B) a PS535 preform after heating under the same conditions as (A); (C) a PS535 preform after heating to desired conditions for blow molding; and (D) a PS535 preform before heating.

FIG. 2 shows (A) a PS535/10A preform after heating to its optimum conditions for blow molding; (B) a PS535 preform after heating under the same conditions as (A); (C) a PS535 preform after heating to its desired conditions for blow molding; and (D) a PS535 preform before heating. The shrinkage of the PS535/10A preform, shown as A, is approximately 20% and the warpage is virtually zero after heated at its optimized condition, while the shrinkage and warpage of the PS535 preform, shown as C, is about 40% and 8%, respectively, after heated at its optimized condition. The nanocomposite (A) exhibited significantly reduced shrinkage and warpage than the neat PS (C) at processing conditions. The nanocomposite required less heating to achieve processing conditions. The PS535 preform (B), subjected to the same heating conditions as the nanocomposite (A), did not absorb the heat as well as the nanocomposite and did not have sufficient heat to achieve blow molding conditions.

TABLE 4

| | Preform | | |
|---|---|---|---|
| | A | B | C |
| Temp (° F.) | 246 | 218 | 260 |
| Shrinkage (%) | 20 | 8 | 40 |
| Warpage (%) | 0 | 0 | 8 |

In addition, it was observed that 535/10A preforms can be blow molded into bottles with less heat compared to neat PS535 preforms. For comparison, both PS535, shown as C in FIG. 2, and 535/10A, shown as A in FIG. 2, preforms were reheated at their optimized conditions and a measurement of the surface temperature was made with an IR thermometer as they exited the oven. The 535/10A, shown as A had a temperature of 246° F. while the PS535 preform shown as C in FIG. 2 had a temperature of 260° F. The PS535 preform was also reheated at the optimized condition for 535/10A and then tested for surface temperature and had a temperature of 218° F., which is shown as B. At the same heating profile (optimized for 535/10A), the surface temperature of 535/10A preform is 28° F. higher than the PS535 preform. At the same time, in order to optimize the heating for the PS535 preforms, they had to be heated to 260° F., which is 14° F. higher than 535/10A preforms.

The 535/10A preforms were successfully blow molded into bottles at a production rate of 3000 b/h. However, the same ADS G62 linear injection stretch blow molder failed to blow mold PS535 preforms at the same conditions owing to a limited heating capacity. The incorporation of clay nanoplatelets into the polystyrene matrix is shown to be able to improve both processability and heating efficiency.

The incorporation of organically modified clay filler can effectively reduce preform shrinkage and avoid warpage during the reheating process, which can improve the processability of PS preforms. In addition, it was also observed that the heating efficiency and effectiveness was improved. The molded 535/10A bottles also exhibit high stiffness. The addition of a small amount of clay into PS preforms not only addresses the processing issue, but can also improve heating efficiency and bottle properties.

Embodiments of the present invention can include preforms having reheat shrinkage of less than 40%, optionally less than 35%, optionally less than 30%, or optionally less than 25%. Embodiments of the present invention can include preforms having reheat warpage of less than 8%, optionally less than 6%, optionally less than 4%, optionally less than 3%, or optionally less than 2%.

Embodiments of the present invention can include preforms having clay nanoplatelets in a PS matrix capable of absorbing IR waves. The preforms of the present invention can reach a temperature higher than that of a substantially similar preform without clay nanoplatelets under the same conditions. The temperature can be at least 5° F. higher, optionally at least 10° F. higher, or at least 15° F. higher than that of a substantially similar preform without clay nanoplatelets under the same conditions.

Embodiments of the present invention can include preforms having a nanocomposite layer and a non-nanocomposite layer. A preform may have an inner layer of nanocomposite material and an outer layer of non-nanocomposite material. Alternately the preform may have an inner layer of non-nanocomposite material and an outer layer of nanocomposite material. Alternately the preform may have multiple layers that include at least one layer of nanocomposite material. An example is a preform that has an inner layer of nanocomposite material with a skin layer on each side of a non-nanocomposite material. A co-extrusion stretch blow molding process is one way of producing a preform having multiple layers.

Use of broader terms such as comprises, includes, having, etc. should be understood to provide support for narrower terms such as consisting of, consisting essentially of, comprised substantially of, etc.

The term "affinity" as used herein shall refer to the tendency of a first material to mix or combine with a second material of unlike composition, such as a solvent and a solute. As used herein two materials have an affinity for each other if there is no more than 3.0 ($MPa^{1/2}$) difference between their solubility parameters.

The term "composite materials" refers to materials which are made from two or more constituent materials (e.g., a layered compound and a polymeric material) with significantly different physical and/or chemical properties and which remain separate and distinct on a macroscopic level within the finished structure.

The term "exfoliation" refers to delamination of a layered material resulting in the formation of disordered layers or sheets.

The term "nanocomposites" refers to materials that are created by introducing nanoparticulates, also termed filler materials (e.g., a layered compound) into a macroscopic material (e.g., a polymeric material), which is typically referred to as the matrix.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

The term "processing" is not limiting and includes agitating, mixing, milling, blending, etc. and combinations thereof, all of which are used interchangeably herein. Unless otherwise stated, the processing may occur in one or more vessels, such vessels being known to one skilled in the art.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed is:

1. A polystyrene based preform useful in blow molding processes comprising:
   a neck;
   a body comprising an external body diameter that forms a sidewall;
   a nanocomposite material including a polystyrene based polymer and a layered compound selected from the group consisting of natural clay, synthetic clay, sols, colloids, gels, fumes, and combinations thereof;
   wherein the layered compound at least contains organoclay, wherein the layered compound is treated with an organic compound to thereby form a material having an affinity with styrene; and
   wherein the organic compound comprises a ring structured group or a methacrylate group selected from the group consisting of: butyl methacrylate, cyclohexane, methyl styrene, cyclopentane, chlorotoluene, methyl methacrylate, xylene, toluene, vinyl toluene, benzene, methylcyclohexanone, styrene, furan, chlorobenzene, cyclohexanone, dichlorobenzene, nitrobenzene, iodobenzene, cyclopentanone, cyclobutanedione, and combinations thereof.

2. The preform of claim 1, wherein the polystyrene based polymer comprises a homopolymer or a styrenic polymer with one or more comonomers, and wherein the polystyrene based polymer is present in the nanocomposite material in an amount of from 90 wt. % to 99.5 wt. % based on the total weight of the nanocomposite material.

3. An article formed by the blow molding of the preform of claim 2, wherein the preform can be blow molded at a lower temperature than that required by a comparable polystyrene material that lacks the nanocomposite material.

4. The preform of claim 2, wherein the polystyrene based polymer further comprises an elastomeric phase that is embedded in a polymer matrix, wherein the elastomeric phase is selected from one or more of a conjugated diene monomer, an aliphatic conjugated diene monomer, and blends or copolymers of the diene monomers, and wherein the elastomeric phase is present in the polystyrene based polymer in an amount ranging from 0.1 wt. % to 10 wt. %.

5. The preform of claim 2, wherein the preform includes at least one layer of the nanocomposite material and at least one layer of polystyrene based polymer that is not a nanocomposite.

6. An article formed by the blow molding of the preform of claim 2, wherein the article comprises a bottle.

7. An article formed by the blow molding of the preform of claim 1.

8. The preform of claim 1, wherein the preform has shrinkage of less than 40% when reheated during a blow molding process.

9. The preform of claim 1, wherein the preform has warpage of less than 8% when reheated during a blow molding process.

10. The preform of claim 1, wherein the layered compound improves the preform heating efficiency and the preform reaches a temperature at least 5° F. higher than an identical preform without the layered compound when reheated during a blow molding process under the same conditions.

11. The preform of claim 1, wherein the preform includes at least one layer of the nanocomposite material and at least one layer of polystyrene based polymer that is not a nanocomposite.

12. The preform of claim 11, wherein the preform is produced by a co-injection blow molding process.

13. The preform of claim 1, wherein the preform is used to make a desired article shape by heating, stretching, and blowing the preform with a compressed gas using an injection stretch blow molding process, and wherein the injection stretch blow molding process is either a single or double stage process.

14. The preform of claim 11, wherein:
the at least one layer of the nanocomposite material is an inner layer; and
the at least one layer of polystyrene based polymer that is not a nanocomposite comprises a skin layer on each side of the nanocomposite material.

15. An article formed by the blow molding of the preform of claim 13, wherein the article comprises a bottle.

16. The article of claim 6, wherein the article made from the nanocomposite material exhibits an increase in a flexural modulus of from 5% to 300%, when compared to a similar article constructed from a similar polymer lacking the layered compound.

17. The preform of claim 1, wherein the organic compound comprises a ring structured group or a methacrylate group selected from the group consisting of: butyl methacrylate, cyclohexane, methyl styrene, cyclopentane, chlorotoluene, xylene, toluene, vinyl toluene, benzene, methylcyclohexanone, styrene, furan, chlorobenzene, cyclohexanone, dichlorobenzene, nitrobenzene, iodobenzene, cyclopentanone, cyclobutanedione, and combinations thereof.

18. The preform of claim 1, wherein the organic compound comprises a ring structured group or a methacrylate group selected from the group consisting of: cyclohexane, methyl styrene, cyclopentane, chlorotoluene, methyl methacrylate, xylene, toluene, vinyl toluene, benzene, methylcyclohexanone, styrene, furan, chlorobenzene, cyclohexanone, dichlorobenzene, nitrobenzene, iodobenzene, cyclopentanone, cyclobutanedione, and combinations thereof.

19. The preform of claim 1, wherein the organic compound comprises a ring structured group or a methacrylate group selected from the group consisting of: cyclohexane, methyl styrene, cyclopentane, chlorotoluene, xylene, toluene, vinyl toluene, benzene, methylcyclohexanone, styrene, furan, chlorobenzene, cyclohexanone, dichlorobenzene, nitrobenzene, iodobenzene, cyclopentanone, cyclobutanedione, and combinations thereof.

* * * * *